Figure 1:
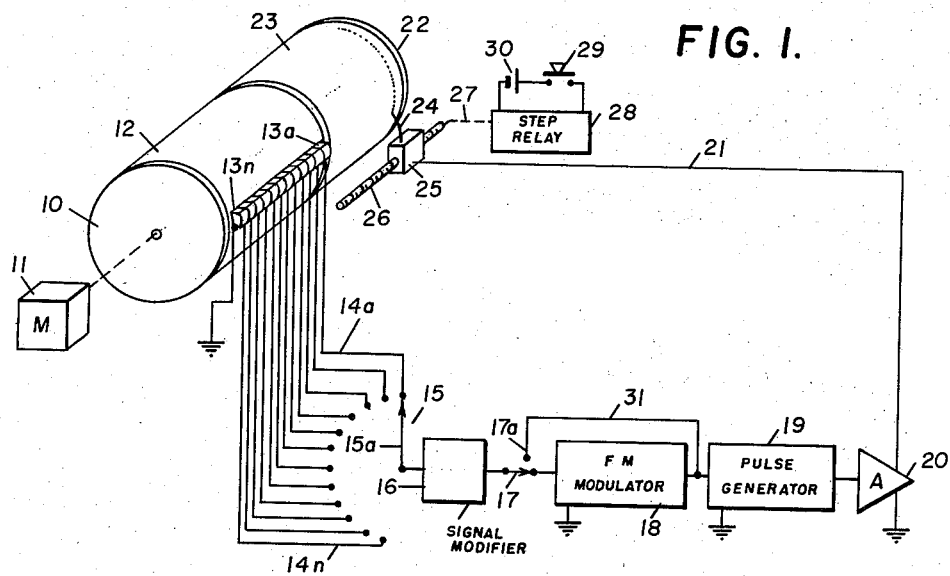

Sept. 24, 1963  G. M. GROENENDYKE  3,105,220
APPARATUS FOR SEISMIC SECTION RECORDING
Filed Oct. 3, 1957  3 Sheets-Sheet 1

United States Patent Office 3,105,220
Patented Sept. 24, 1963

3,105,220
APPARATUS FOR SEISMIC SECTION RECORDING
Goethe M. Groenendyke, Dallas, Tex., assignor, by mesne assignments, to Socony Mobil Oil Company, Inc., New York, N.Y., a corporation of New York
Filed Oct. 3, 1957, Ser. No. 687,974
6 Claims. (Cl. 340—15.5)

This invention relates to the production of cross-sections of the earth from seismic information and more particularly to the presentation of a cross section or seismic section as a variable-density recording by recording on an electro-sensitive medium electrical impulses whose rate varies in dependence upon the instantaneous amplitude of the seismic signal whereby a variable density type seismic section may be observed as it is produced.

In the prior art, seismic sections are produced by initiating an impulse, for example, the detonation of an explosive charge, and detecting acoustic energy at a plurality of spaced points at the earth's surface which result from the reflection of the initial impulse from discontinuities of strata within the earth. The energy received at the spaced points is recorded as a wave form to produce a seismogram. By assembling a plurality of seismograms taken across a given traverse of the earth and after correcting the seismograms for spread geometry or moveout error and for weathering, the various traces comprising the seismograms are aligned on a single record which depicts a cross section of earth structure under a surface traverse which may extend from several hundred feet to several miles.

Discontinuities in earth strata are best represented and stand out more clearly where the record section is of a variable density type. This type of record section has been produced in the past by employing a light-sensitive medium and a galvanometer which varies the intensity of light directed upon the medium in accordance with the amplitude of the seismic wave being recorded. There are disadvantages in such a system which are overcome by the present invention. These disadvantages are introduced because of the inability of an operator to monitor the record as it is being produced. Seismic sections may be comprised of hundreds of aligned traces; and should an error be produced during the process of making up the section, it will not be detected until after the entire section has been produced and the light-sensitive medium developed. Therefore, it might be necessary to reproduce the entire section.

By means of the system of the present invention, the variable density record section is visible to the operator as it is being produced. Therefore, should there be an error in the operation of the system, for example, the stepout correction, or an uncompensated shift in weathering, or indeed a failure of the recording equipment itself, such error will be immediately discernible to the operator who will then be in position to take immediate steps to correct it without necessarily, as in the past, waiting until the entire section has been produced and then finding it necessary to reproduce the section in order to remove the error.

More particularly and in accordance with the present invention, the variable-density representation of a seismic wave is provided by generating a signal whose frequency is representative of the instantaneous magnitude of the seismic wave. The frequency of the signal is varied in dependence upon variations in the magnitude of the seismic wave. Pulses are generated at a frequency corresponding with the frequency of the signal, and these pulses are recorded as distinct visible marks along a time scale representative of the time scale of the seismic wave.

The recording of the pulses is made upon an electro-sensitive medium by generating a spark in response to the generation of each of the pulses.

Figure 4:
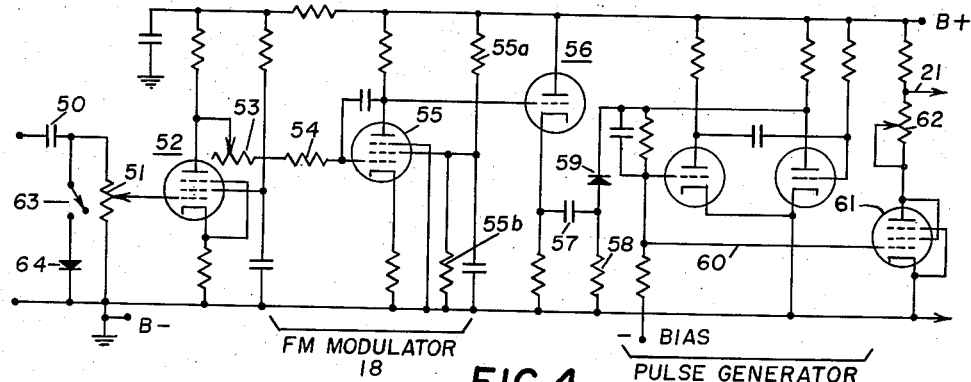
Figure 2:
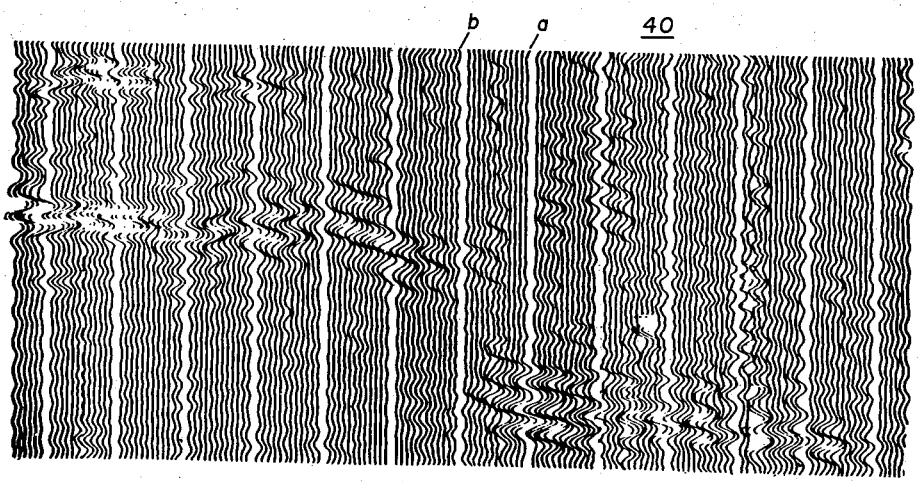
Figure 3:
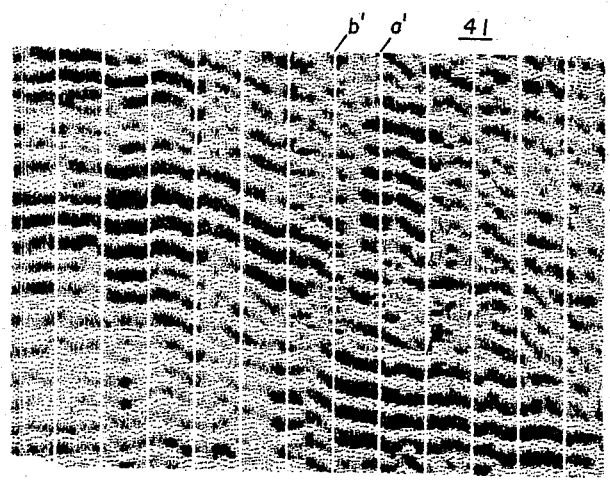
Figure 5:
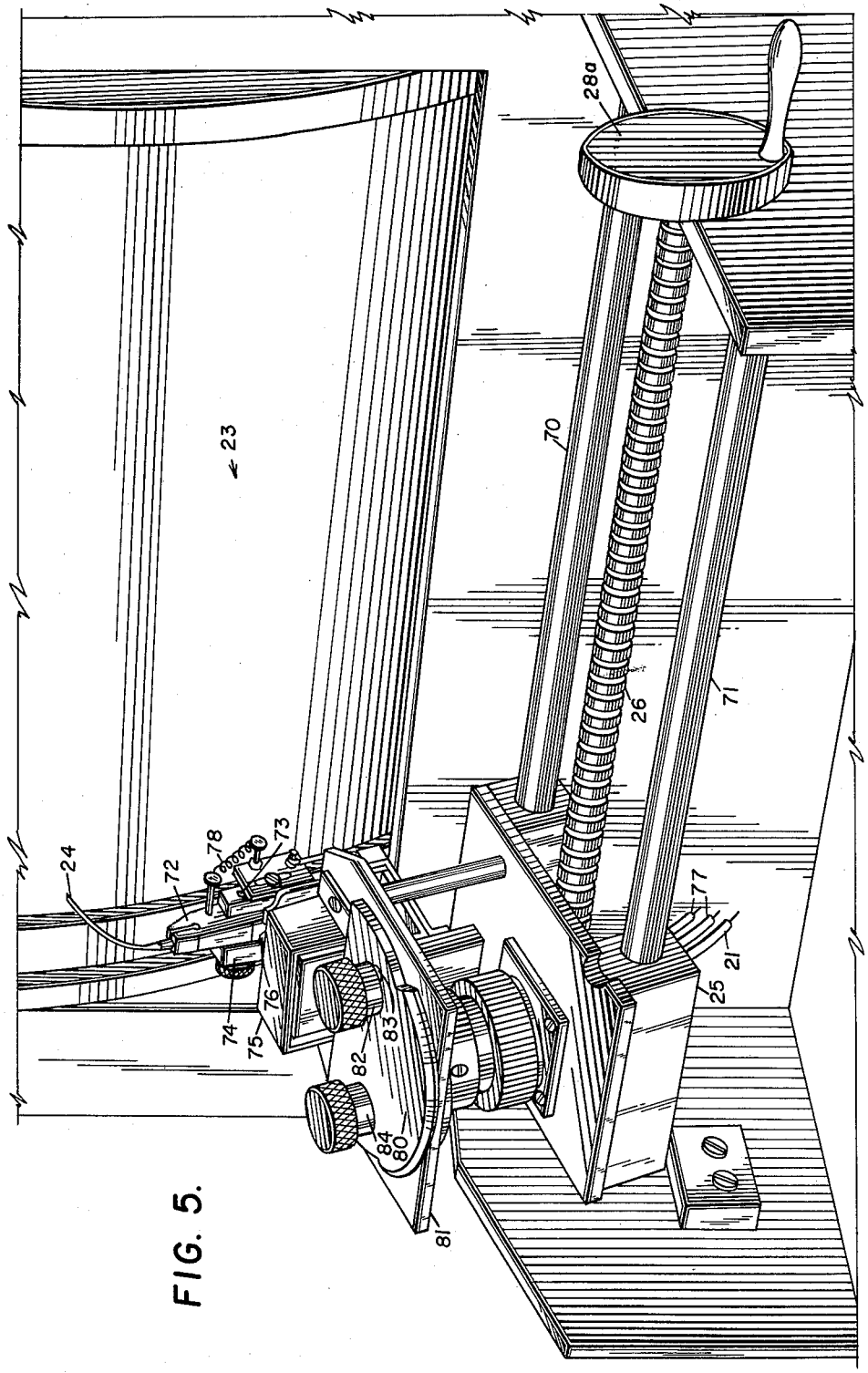

For other objects and advantages of the present invention reference may be had to the following detailed description and accompanying drawings, in which:

FIG. 1 schematically illustrates a seismic section printing system employing the present invention;
FIG. 2 is a portion of a seismic section in which the seismic traces appear as amplitude-modulated waves;
FIG. 3 is the same seismic section as FIG. 2 but made in accordance with the present invention;
FIG. 4 schematically illustrates one circuit arrangement for carrying out the present invention; and
FIG. 5 is a perspective view of apparatus suitable for recording data on an electro-sensitive medium.

Referring now to FIG. 1, there is illustrated a system for producing a visual record of the cross section of the earth from information contained in one or more seismograms. The new record thus formed from a plurality of seismograms, each including one or more seismic traces, will be referred to hereinafter as a seismic section. The system includes a drum 10 driven at a selected speed by a motor 11. A suitable drum and motor combination is available from Southwestern Industrial Electronics, Houston, Texas, and has provision for mounting about the periphery thereof a seismogram 12 upon which seismic traces have previously been recorded in a phonographically reproducible manner. Preferably, the seismogram 12 is in the form of a magnetic tape upon which is recorded six or more seismic traces. In one embodiment, a magnetic tape of 4½ inches in width is employed for recording 24 seismic traces.

The seismic record or tape 12 may be a tape produced in the field or it may be, and preferably is, a magnetic record in which corrections have been made to remove errors present due to spread geometry or moveout and for weathering. In addition, the seismic traces on the record may also have been subject to filtering operations or other modifications well-known in the art for the purpose of emphasizing the reflection waveform.

The drum 10 constitutes part of a reproduction or play-back system which also includes a plurality of detecting heads 13a—13n. While twelve detecting heads have been illustrated, it will be understood that the number of heads will conform with the number of seismic traces present on the tape 12. One side of each of the detecting heads 13a—13n is connected to ground and the other side of each is connected by way of conductors 14a—14n to the contacts of a selector switch 15.

Assuming initially that the information on the tape 12 is in the form of varaible amplitude waves, the movable contact 15a of selector switch 15 is moved to a first position and the drum 10 rotated to produce electrical signals from the detecting head 13a which are applied by way of conductor 14a, switch 15, signal modifier 16, and switch 17 to an FM modulator 18. The FM modulator produces a signal of frequency representative of the instantaneous magnitude of the seismic wave. Depending upon the character of the signal as will be explained in detail hereinafter, the frequency of the signal from the FM modulator will either vary linearly with the magnitude of the signal or inversely with the magnitude of the signal.

The signal output from the FM modulator is then applied to the input of a pulse generator 19 whose output signal is in the form of pulses whose frequency corresponds with the frequency of the FM modulator. These pulses are then amplified by the amplifier 20 and applied by way of conductor 21 to a recording means 22 for the recording on an electro-sensitive medium 23 of distinct marks along a time scale representative of the time scale of the original seismic wave. A record section on the electro-sensitive medium 23 with the same time scale as the original seismogram is readily provided by mounting the electro-sensitive medium 23 on the same drum as the seismogram or on a second drum mechanically coupled to the first drum 10 and driven at the same rate of speed.

A suitable electro-sensitive medium or paper is commercially available from the Times Facsimile Corporation, New York city, New York, and is identified as "Timefax." Such electrosensitive paper comprises a conductive layer covered with a very thin paper layer. The paper surface is engaged by a stylus 24 mounted on a carriage 25. Each time a pulse is applied to the conductor 21 and thence to the stylus 24, an arc forms between the tip of the stylus 24 and the conductive backing of the electrosensitive medium 23 to burn the paper at one point and expose the conductive surface and thus provide a distinctive mark. The number of marks made per unit length along the medium 24 will be a function of the magnitude of the seismic wave on the record 12. Thus, there will be produced with the system above-described a variable-density recording of the originally recorded seismic wave.

After the drum 10 has made one rotation, the movable contact 15a of switch 15 is moved to a second position and the carriage 25 is moved so as to place the stylus 24 in a position adjacent the first recording medium on the electro-sensitive medium 23 preparatory to the production of a second trace. The movement of the carriage 25 may be effected by rotating a threaded shaft 26 mounting the carriage 25. The shaft 26 is coupled by way of coupling means 27 to a step relay 28 which may be energized by closing switch 29 for flow of current from battery 30.

A comparison between seismic sections made by prior art arrangements and a seismic section made in accordance with the present invention is illustrated in FIGS. 2 and 3. The seismic section 40 of FIG. 2 is shown comprised of a plurality of amplitude-modulated seismic traces. Each portion of the section 40 as between points $a$ and $b$ is comprised of 12 traces. The same section of the earth is represented in FIG. 3 by the seismic section 41. The original recording was approximately 7 inches in width and each group of traces as between points $a'$ and $b'$ covered ½ inch of the width of the section. The portion of the section 41 between points $a'$ and $b'$ is the same as the section $a$, $b$ of FIG. 2. In addition to providing a constant monitoring of the seismic section as it is being produced, the present invention also makes more readily discernible to the seismologist the presence of faults or other discontinuities and layerings in the earth as represented by the seismic section.

Where the original seismic record appearing on the magnetic tape 12 is in the form of a frequency-modulated signal and where the record 12 has been corrected and filtered, the system of FIG. 1 may be modified to bypass the FM modulator 18 and to feed the output of the detectors 13a—13n directly to the input of the pulse generator 19. Such modifications may be readily effected by moving the switch 17 from its illustrated position to engagement with contact 17a. Accordingly, the outputs from the detectors 13a—13n will now be applied by way of conductor 31 to the input of the pulse generator 19.

The present invention is also applicable for use in other forms of playback systems. For example, many seismograms made in the field today are in the form of magnetic tapes on which are recorded frequency-modulated signals. The signals are usually of a very low magnitude. Before filtering and stepout correction is effected on the seismogram it is usually preferred to amplify these signals and convert them from frequency-modulated to variable amplitude signals. Such an arrangement may also be described in conjunction with the arrangement of FIG. 1.

Assuming now that the signals recorded on the magnetic tape 12 are in the nature of frequency-modulated seismic waves which have not been corrected or filtered, these signals may be applied as before by way of the detectors 13a—13n to the selector switch 15. Each trace may then be applied to the signal modifier which in its block form is intended to include such equipment as may be necessary to amplify the signal, demodulate it, i.e., to convert the FM signal to a variable amplitude signal, to filter the signal, and to correct it for weathering and moveout. Systems for filtering, amplifying, and correcting waveforms are well-known in the art. After the necessary modifications, the signal, which is in variable amplitude form, will then be applied by way of the switch 17 directly to the FM modulator 18 for operations as heretofore described.

Referring now to FIG. 4, there is illustrated one form of circuit for producing the pulses applied to the recording medium 23. The circuit of FIG. 4 is intended for use where the seismic signal is either originally in the form of a variable amplitude signal or originally as a frequency-modulated signal which has undergone some transformation and modification as by the signal modifier 16 and emerges in corrected form as a variable amplitude signal.

The variable amplitude signal is applied by way of capacitor 50 and potentiometer 51 to the input of an amplifier stage 52. The amplifier stage 52 is a conventional voltage amplifier, here shown employing a pentode tube which may be of the 6AU6 type. The output from the amplifier stage 52 is taken from the plate circuit and applied by way of rheostat 53 and resistor 54 to the control grid of a free running oscillator of the phantastron type which comprises the FM modulator 18.

A phantastron can exist in either astable or monostable form as set forth in Waveforms, by Chance et al., at pages 199–204. The cathode-coupled phantastron which is the type illustrated in FIG. 4 may be made free running or astable by returning the suppressor grid of tube 55 to ground and close to cathode voltage so that at no time will the plate-cathode current be cut off. Since the cathode voltage is determined in part by the screen-cathode current, the voltage difference between the suppressor and the cathode can be made small at a time subsequent to run-down by reducing the value of the screen voltage below that normally applied to the monostable type of cathode-coupled phantastron. The reduction in plate voltage applied to the screen may be accomplished as illustrated by use of a voltage divider comprised of the resistors 55a and 55b.

The frequency of the modulator or phantastron oscillator 18 depends upon two factors. One of them is the value of the parameters employed in the circuit, and the second is the value of the voltage to which the grid circuit of tube 55 is returned. It is this second factor that is employed when the oscillator is to be employed as an FM modulator. More particularly, a voltage representative of the varying amplitude of the seismic signal is applied to the control grid of tube 55. This voltage is obtained from the plate circuit of the amplifier stage 52 which voltage varies with change in the seismic signals applied to its grid circuit as by way of coupling capacitor 50 and the potentiometer 51.

In one embodiment, the phantastron oscillator or FM modulator 18 has a frequency range of from 150 to 750 cycles per second. The phantastron operates about a frequency of 350 cycles, this latter frequency being representative of zero seismic signals. Thereafter, the frequency of the oscillator varies about the mid-frequency with variations in the amplitude of the seismic signal. The frequency of the phantastron or FM modulator 18 may be adjusted for the zero seismic signal level by varying the rheostat 53.

In one embodiment, the components of the phantastron oscillator had the following values to produce the desired frequency range of from 150 to 750 cycles per second. Resistor 55a was 100,000 ohms; resistor 55b was 56,000 ohms; the cathode-resistor was 6,800 ohms; and the feedback capacitor was 250 microfarads.

With the connection as shown the frequency of the FM modulator 18 will vary inversely with the magnitude of the signal applied to the grid of the stage 52; and, therefore, inversely with the magnitude of the seismic signal. Where it is desired to have the frequency of the modulator 18 vary with the magnitude of the seismic signal, the circuit may be modified by providing an additional amplifier stage and, thus, effect an inversion of the signal applied to the control grid of tube 55. Other methods may also be employed for the inversion, one of which will be discussed hereinafter.

The output from the FM modulator or phantastron oscillator 18 is a sawtooth voltage which is taken from the plate of the tube 55 and applied to a cathode-follower stage 56. The output from the cathode-follower stage 56 is differentiated in a network comprised of capacitor 57 and resistor 58 to produce a series of pulses which are then applied by way of rectifier 59 to trigger the pulse generator 19. The generator 19 may be comprised of a monostable multivibrator, any number of which are well-known in the art. More specifically, the pulse generator 19 is shown to be of the type illustrated and described in Waveforms, by Chance et al., at page 168. The output from the pulse generator is a series of rectangular pulses whose frequency corresponds with the frequency of the output signals of the FM modulator 18. This output signal is applied by way of conductor 60 to the control grid of an amplifier stage 61. The amplified pulses are taken from the plate circuit of the stage 61 and applied by way of conductor 21 to the stylus 24, FIG. 1.

In the circuit illustrated, the output pulses from the stage 61 will be a series of negative-going pulses, that is, negative with respect to B+. In such an arrangement, the conductive surface of the recording medium 23 will be connected to the B+ supply of FIG. 4. Accordingly, each time the voltage changes in the plate circuit of the stage 61, a voltage drop will appear between the stylus 24 and the conductive backing of the recording medium 23 to produce a mark on the face of the recording medium.

The level of the pulse appearing in the plate circuit of the stage 61 may be adjusted by means of rheostat 62. This affords a means for controlling the magnitude of the potential difference between the stylus 24 and B+ and, thus, prevents an excessive burning of the record.

In the system as thus far described, the FM modulator 18 produces an output signal whose frequency varies about a selected average frequency, for example, 350 cycles per second. This average frequency corresponds with zero input signal applied to the amplifier stage 52. Zero signal level is here selected as the average value of the seismic signal or rather a level of input signal which occurs in the absence of any seismic events. Since the frequency of the oscillator varies about this average value, there is produced on the electro-sensitive paper or record 23 a variable density recording on which the average or zero seismic signal will appear gray. If the modified system employing an additional amplifier stage, as described above, is employed maximum positive seismic signal will appear black, and maximum negative seismic signal will appear almost white or whatever the original color of the surface of the paper 23. The appearance on the paper may also be correlated with the frequency of the oscillator. The black appearance on the paper represents maximum output or frequency from the oscillator; whereas, the white appearance represents the minimum output or frequency of the oscillator. Thus, reflection signals or events of small amplitude will be neither black nor white on the record 23, but some variation of gray.

While a record produced in this manner is suitable, the presentation of the record section on the record 23 may be substantially improved by modifying the circuit of FIG. 4 so that for each negative peak of a seismic pulse or event, and independent of extent, there will be a minimum output from the oscillator and pulse generator. For all other portions of the seismic pulse or event, that is the positive going excursions, the record will be made more dark. This may be accomplished by referring the input or seismic signal to a new level other than the average signal level and one which follows either the positive or negative peaks of the seismic events or pulses. The reference level is varied by providing a D.C. restorer circuit. Such a circuit is included in the input circuit of the amplifier stage 52 and comprises the capacitor 50, the resistance 51, and the rectifier 64. D.C. restorer action is initiated by closing the switch 63 which adds the rectifier 64 in the circuit. The switch 63 is provided so that the circuit may operate either with or without D.C. restoration. Of course, if D.C. restoration is to be used at all times, the switch 63 may be omitted.

With the switch 63 closed, the D.C. restoration circuit is connected and, in a manner well-known in the art, will refer either all the negative or all the positive peaks, depending upon the connection or phasing of the rectifier 64, of the input signal to a zero level. With the connections as shown, the control grid of the amplifier stage 52 will always be either at ground or some potential negative with respect to ground. Accordingly, as the seismic signal applied to the input circuit increases, the grid becomes more and more negative and causes the plate voltage to rise. This, in turn, has the effect of increasing the frequency of the oscillator or FM modulator 18 to increase the number of marks per unit length on the record 23. Therefore, the frequency of the oscillator or FM modulator 18 will always increase in one direction from a base point, which base point will be taken as zero input signal. For a more detailed description of the operation of a D.C. restorer circuit, reference may be had to Waveforms, by Chance et al., page 55.

While the present invention may be employed with different forms of printers suitable for use with electro-sensitive paper, a preferred form of printer is illustrated in FIG. 5. The carriage 25 is mounted for slidable movement along a pair of guide rails 70—71 and is driven along the rails and relative to the paper 23 by means of a traveling nut assembly including the threaded shaft 26. The shaft may be driven either by the step relay 28 as shown in FIG. 1 or by manipulation of the knob or control wheel 28a.

The writing stylus 24, which in one embodiment is of phosphor-bronze and has a writing width of 1/16 inch is mounted on a block 72, pivotally mounted by way of shaft or pivot 73 to a bifurcated supporting member 74.

The stylus 24 is rotated about pivot 73 toward and away from the surface of the electro-sensitive paper by means of a relay 75. With the relay 75 in a de-energized condition, armature 76 of the relay is forced against the lower end of the supporting block 72 to pivot the stylus 24 away from the paper 23. When the relay is energized, the armature 76 moves away from the lower end of the supporting block 72 and a spring 78 urges the stylus 24 into engagement with the paper 23 by moving the supporting block about pivot 73. The relay 75 is energized at the discretion of the operator by means of a circuit comprising conductors 77 connected to a suitable source of power, not shown.

The supporting block 72 and the relay 75 are both mounted to a plate 80 which is made movable relative to a supporting plate 81 to permit adjustment of the tip of the stylus 24 so that the tip may be at all times parallel with the surface of the recording paper 23. The adjustment of the plate 80 and hence the adjustment of the position of the stylus 24 is effected by way of a cam 82 which engages a cam-follower portion 83 in the plate 80. The cam 82 is an eccentric shaft so that rotation thereof will cause the plate 80 to rotate about the pivot 84.

Now that the principles of the invention have been explained and one embodiment thereof fully described, it will be understood that modifications may be made and certain parts may be used in place of other parts all within the scope of the appended claims.

What is claimed is:

1. A system for producing a variable-density representation of a seismic wave comprising a detector, means for moving a phonographically-reproducible seismogram past said detector for producing an electrical signal representative of the variations in the magnitude of the seismic wave, a variable-frequency oscillator responsive to said electrical signal for converting the amplitude variations of said electrical signal to a frequency-modulated signal, a differentiator responsive to said frequency-modulated signal to produce sharp pulses, a pulse generator responsive to said sharp pulses for generating rectangular pulses whose frequency corresponds with the frequency of said frequency-modulated signal, means for energizing an electro-sensitive recording medium with said rectangular pulses, and means for moving the medium at the same rate as said seismogram is moved.

2. A system for producing a variable-density representation of a seismic wave comprising a detector, means for moving a seismogram past said detector for producing an electrical signal representative of the variations in the magnitude of the seismic wave, a phantastron oscillator responsive to said electrical signal for converting amplitude variations of said electrical signal to a frequency-modulated signal, a differentiator responsive to said frequency-modulated signal to produce sharp pulses, a pulse generator responsive to said sharp pulses for generating rectangular pulses whose frequency corresponds with the frequency of said frequency-modulated signal, means for energizing an electro-sensitive recording medium with said rectangular pulses, and means for moving the medium at the same rate as said seismogram is moved.

3. A system for producing a variable-density representation of a seismic wave comprising a detector, means for moving a seismogram past said detector for producing an electrical signal representative of the variations in the magnitude of the seismic wave, a phantastron oscillator responsive to said electrical signal for converting the amplitude variations of said electrical signal to a frequency-modulated signal, a differentiator responsive to said frequency-modulated signal to produce sharp pulses, a monostable multivibrator responsive to said sharp pulses for generating rectangular pulses whose frequency corresponds with the frequency of said frequency-modulated signal, means for energizing an electro-sensitive recording medium with said rectangular pulses, and means for moving said medium at the same rate as said seismogram is moved.

4. A system for producing a variable-density representation of a seismic wave comprising a detector, means for moving a reproducible seismogram past said detector for producing an electrical signal representative of the variations in the magnitude of the seismic wave, a D.C. restorer for referring said electrical signal to a selected reference level, an FM modulator responsive to said electrical signal above said selected level for converting said electrical signal to a frequency-modulated signal whose frequency varies with change in the magnitude of said electrical signal, a differentiator responsive to said frequency-modulated signal to produce sharp pulses, a pulse generator responsive to said sharp pulses for generating rectangular pulses whose frequency corresponds with the frequency of said frequency-modulated signal, means for energizing an electro-sensitive recording medium with said rectangular pulses, and means for moving the medium at the same rate as said seismogram is moved.

5. A system for producing a variable-density representation of a seismic wave and visible during its production, comprising a detector, means for moving a reproducible seismogram past said detector for producing an electrical signal representative of the variations in the magnitude of the seismic wave, a phantastron oscillator for converting the electrical signal to a frequency-modulated signal whose frequency varies with change in the magnitude of the electrical signal, a differentiating network responsive to the output of said phantastron oscillator for producing a series of sharp pulses, a monostable multivibrator responsive to pulses from said differentiating network for producing a series of rectangular pulses whose frequency corresponds with the frequency of said frequency-modulated signal, means for energizing an electro-sensitive recording medium with said rectangular pulses, and means for moving the medium at the same rate as said seismogram is moved.

6. Recording apparatus for producing an instantaneously visible variable-density representation of seismic waves comprising reproducing playback head means, means for mounting a multichannel magnetic record for repeat movement past said head means for reproduction of magnetically recorded seismic signals thereon, a visual recorder means, means for mounting a multichannel electro-sensitive record medium for movement repeatedly past said recorder means, means for connecting said recorder means sequentially to individual ones of said head means upon successive movements of the magnetic record and the record medium past said head means and said visual recorder means respectively to sequentially reproduce on the record medium a visual variable-density representation of the seismic signals recorded on the magnetic record, a variable frequency oscillator responsive to signals reproduced from the magnetic record for converting amplitude variations of said signals to frequency-modulated signals, a differentiator responsive to said frequency-modulated signals to produce sharp pulses, a pulse generator responsive to said sharp pulses for generating rectangular pulses whose frequency corresponds with the frequency of said frequency-modulated signals, means for applying said rectangular pulses to said recording means for energizing the electro-sensitive recording medium, and means for moving the magnetic record and the electro-sensitive medium together in physical synchronism during repeat movements thereof to maintain among the signal reproductions on the record medium at the several channels thereon the same time relationship as among the recorded signals at the several channels on the magnetic record.

References Cited in the file of this patent

UNITED STATES PATENTS

| | | |
|---|---|---|
| 2,294,149 | Kline et al. | Aug. 25, 1942 |
| 2,425,003 | Potter | Aug. 4, 1947 |
| 2,743,785 | Lee | May 1, 1956 |
| 2,757,357 | Peterson | July 31, 1956 |
| 2,767,388 | Rust | Oct. 16, 1956 |
| 2,803,515 | Begun | Aug. 20, 1957 |
| 2,876,428 | Skelton et al | Mar. 3, 1959 |
| 2,877,080 | Eisler et al. | Mar. 10, 1959 |
| 2,941,184 | Moody | June 14, 1960 |
| 3,006,713 | Klein et al | Oct. 13, 1961 |